United States Patent [19]
Klosterman et al.

[11] 3,726,070
[45] Apr. 10, 1973

[54] STAGGERED BLADE MOWER

[75] Inventors: Albert L. Klosterman, Cincinnati, Ohio; Dale A. Klemenhagen, Minneapolis, Minn.

[73] Assignee: Toro Manufacturing Corporation, Minneapolis, Minn.

[22] Filed: Aug. 11, 1969

[21] Appl. No.: 849,034

[52] U.S. Cl. ................................................. 56/294
[51] Int. Cl. ............................................. A01d 55/20
[58] Field of Search ........................ 56/294, 249, 295

[56] References Cited

UNITED STATES PATENTS

| | | |
|---|---|---|
| 578,250 | 3/1897 | Holland-Letz..........................56/294 |
| 3,162,990 | 12/1964 | Cook.....................................56/295 |
| 2,056,369 | 10/1936 | Roessel..................................56/294 |
| 2,600,892 | 6/1952 | Madsen..................................56/294 |

Primary Examiner—Louis G. Mancene
Assistant Examiner—J. N. Eskovitz
Attorney—Vernon A. Johnson and Thomas A. Lennon

[57] ABSTRACT

A reel for a reel type mower having unequally spaced blades, in which the distance or angle between each pair of adjacent blades is different from the distance or angle between every other pair of adjacent blades on the reel.

7 Claims, 6 Drawing Figures

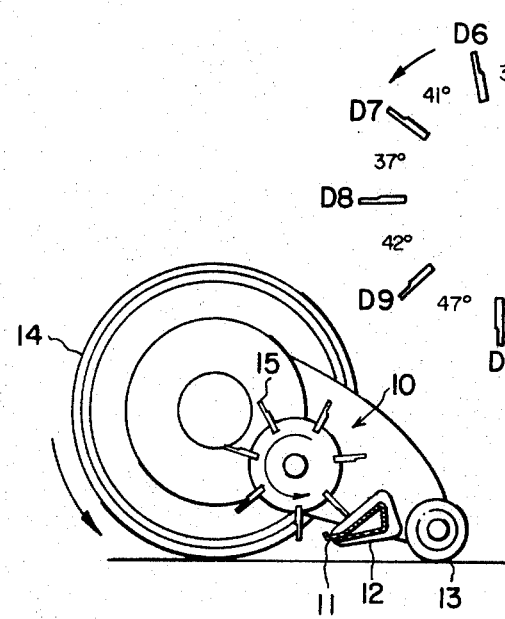
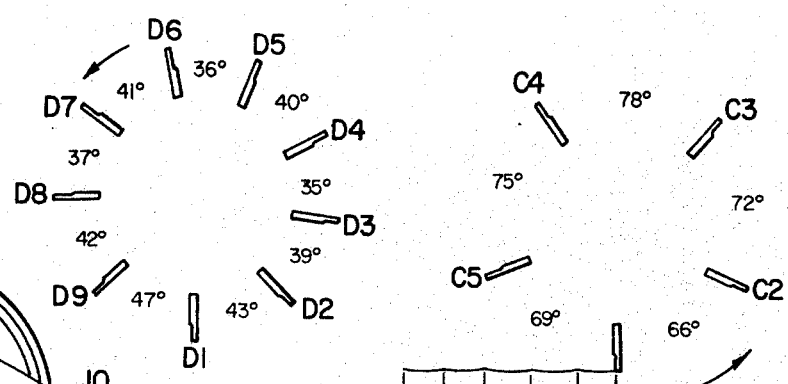
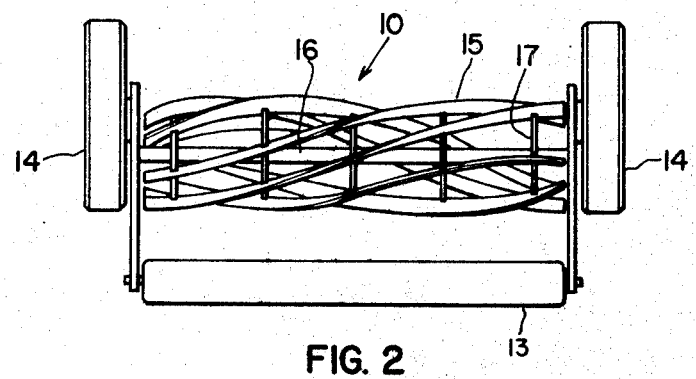
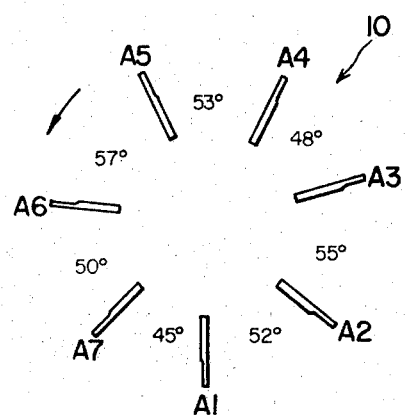
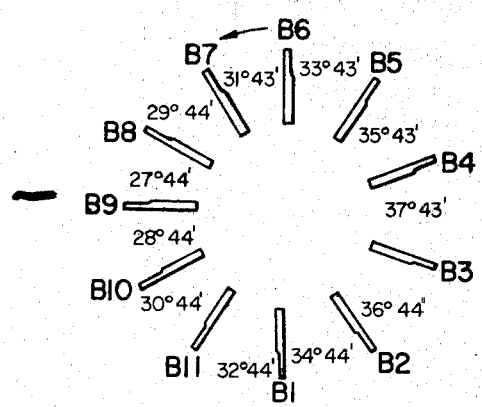
FIG. 1
FIG. 2
FIG. 3
FIG. 4
FIG. 5
FIG. 6
INVENTORS.
ALBERT L. KLOSTERMAN
DALE A. KLEMENHAGEN
By THOMAS A. LENNON
ATTORNEY

STAGGERED BLADE MOWER

Reel mowers have long been plagued with the problem of uneven wear characteristics between the reel blades and the bed knife (also known as rifling) and the attendant vibration chatter and deterioration associated therewith.

This uneven wear and vibration (rifling) phenomenon occurs because of the necessary contact between the reel blades and bed knife to effect a desired shearing action on the grass to be cut.

The main object of this invention is to provide a reel mower in which the aforementioned uneven wear phenomenon (or rifling) is minimized or eliminated.

Mower reels have always been made with the blades thereof equally spaced from one another.

Investigation and study has shown that the impact of the reel blades on the bed knife excites the first natural frequency of the bed knife. When this occurs, the bed knife vibrates at high amplitude and heavy interference results between the reel blades and the bed knife. The steady rate of vibration occurs at the same frequency as the impacts per second. Therefore, for an eight bladed reel, as the bed knife oscilates through one cycle, the reel has made ⅛ of a revolution. With this phenomenon the reel blades strike the bed knife at exactly the same position as the previous blade hit it, thus causing the aforementioned rifling.

It has been found that rifling can be substantially minimized, in some cases eliminated, by redesigning the reels so that the spacing between the reel blades varies from blade to blade. This reduces the dominant frequency content of the exciting force and thereby reduces the amplitude of vibration. Another important result of the unequal spacing between the blades is the fact that as the bed bar oscilates through one cycle the reel rotates through a fraction of a revolution corresponding to the number of blades such as ⅛ of a revolution for an eight bladed reel. However, since the reel blades are unequally spaced, the next succeeding blade will not strike the bed knife at the same place as the previous blade struck the bed knife as would be in the case in a conventional reel with equally spaced blades, and therefore, the blades of a reel having unequally spaced blades will each strike the bed knife at a different place then the other blades, thereby spreading the wear over a greater area and substantially reducing the interference between the reel blades and the bed knife.

Another object of this invention is to provide a quieter reel mower than has heretofore been available.

These and other objects and advantages of this invention will more fully appear from the following description made in connection with the accompanying drawings, wherein like reference characters refer to the same or similar parts throughout the several views, and in which:

FIG. 1 is a fragmentary side elevational view of a reel mower embodying an improved seven bladed reel of this invention;

FIG. 2 is a top plan view thereof;

FIG. 3 is a schematic view of the seven bladed reel of FIG. 1;

FIG. 4 is a schematic view of an eleven bladed reel constituting another preferred embodiment of this invention;

FIG. 5 is a schematic view of a five bladed reel constituting another preferred embodiment of this invention; and FIG. 6 is a schematic view of a nine bladed reel constituting still another preferred embodiment of this invention.

The mower illustrated in FIG. 1 includes a cutter reel 10 of this invention, which cutter reel works in cooperation with a bed knife 11 supported in turn by a bed bar 12 with a roller mounted there behind, and ground wheels 14 on opposite side thereof. The reel 10 includes a plurality of spiral and helical blades 15 which are mounted on the rotatable reel shaft 16 by means of spiders 17, the blades 15 cooperating with the stationary bed knife 11 to cut the grass by means of a shearing action therebetween, in a manner typical of conventional reel mowers.

Since the invention herein lies in the angular displacement or spacing of the reel blades 15, it is believed that further description of other parts of the mower is unnecessary for a full understanding of the invention.

It is also to be understood that the inventive principles set forth therein are applicable to any type of reel mower, including self-propelled, walk behind, and tractor drawn gang mowers. However, the specific embodiments illustrated and described herein are designed for use in gangs to be drawn behind turf tractors.

Broadly stated, the invention herein lies in providing unequal circumferential spacing (see FIGS. 3–6) between the real blades, in contrast to the equal uniform spacing of conventional reel mowers. Each pair of adjacent blades preferrably has a spacing therebetween different from the spacing between every other pair of adjacent blades in the assembly, and the differences in spacing are preferrably randomly applied so that the differences between adjacent pairs of blades are not uniformly progressive about the circumference of the reel. Best results are attained when the reel comprises an odd number of blades. Clip differential is also important, in order to provide an acceptable quality of cut. It has been found that best results are attained when the clip differential between successive clips falls substantially within the range of a maximum of 0.170 inches and minimum of 0.018 inches and the differential between the narrowest and widest clip in a given assembly is substantially in the range of 0.190 to 0.300 inches. Also, the difference in angular displacement between adjacent pairs of adjacent blades is preferably substantially in the range of 1° to 9°, and the difference between any two pairs of blades in the assembly is preferably substantially in the range of 1° to 16°.

The reel illustrated in FIGS. 1–3 inclusive is a seven bladed reel in which the blades are identified by the letters A1 through A7 inclusive reading counterclockwise when viewing the reel as illustrated in FIG. 1 from the left side thereof.

If the illustrated reel were of the conventional type, the blades would be equally spaced by an angular displacement corresponding to 1/7 of 360° or approximately 51.43°. However, it will be noted that in the illustrated reel, the blades are unequally spaced from each other and in fact the spacing between each pair of adjacent blades is different from the spacing between any other pair of adjacent blades. Thus, in the illustrated embodiment, A1 and A2 are offset by an angle of 52°, A2 and A3 by 55°, A3 and A4 by 48°, A4 and A5 by 53°, A5 and A6 by 57°, A6 and A7 by 50° and A7 and A1 by 45°. Thus, in the illustrated 7 bladed reel, the difference in angular displacement between adjacent pairs of blades ranges from 3 to 7°. Since each blade has a different angular displacement from every other blade, and since successive blades are unequally spaced, the blades are out of phase with the vibrational frequency of the bed knife. Therefore, each blade strikes the bed knife at a different location than the other blades, (in contrast to equally spaced blades which strike the bed knife at the same position), thereby spreading the contact and wear over a much larger area, thereby minimizing uneven wear and substantially increasing the life of the blades and bed knife.

The degree of wear on the reel blades and the bed knife is directly related to the force of impact therebetween, which in turn is directly related to the amount of vibration of the bed knife. Thus, the greater the vibration, the greater the wear, and vice versa. One of the advantages of this invention is that the unequal blade spacing reduces the vibrations of the bed knife, which in turn reduces the wear and prolongs the life of the reel blades and bed knife because it reduces the force of impact between the blades and bed knife on each strike therebetween.

The blades are not only unequally spaced, but also the different spacing is randomaly applied throughout the entire circumference of the reel so that the differences are not uniformily progressive in either direction through out the entire circumference of the reel.

The actual spacing between blades is dependent upon many factors including the speed of the rotation of the reel, the ground speed of the unit, etc., with the minimum spacing being that necessary to get all the grass between the blades and the bed knife. However, experiences to date have shown that the maximum angular displacement between the blades should not be in excess of 60° for a seven bladed reel.

It has also been found that the aforedescribed random unequal spacing between the blades results in a quieter mower than has heretofor been available.

The unevenly spaced blades normally will create an unbalanced situation in the reel itself and to correct this unbalanced situation, counterweights are installed in the spiders of the reel.

In one preferred embodiment of the seven bladed reel illustrated in FIG. 3, the clip between A1 and A7 is 0.84 inches, 0.93 inches between A7 and A6, 1.06 inches between A6 and A5, 0.99 inches between A5 and A4, 0.87 inches between A4 and A3, 1.02 inches between A3 and A2, and 0.97 inches between A2 and A1. The maximum clip differential in this arrangement between adjacent clips is 0.150 inches, and the minimum clip differential between adjacent clips is 0.050 inches, with a differential of 0.22 inches between the widest and the narrowest clip; with a total clip of 6.702 inches for one complete revolution of the reel.

Regarding the seven blade reel of FIG. 3, the successive difference in angular displacement between adjacent pairs of adjacent blades, beginning with the adjacent pair A1-A2 and A2-A3 is 3°, 7°, 5°, 4°, 7°, 5°, 7° with a minimum difference in angular displacement between any given pair of adjacent blades and any other pair in the assembly being 3° with the maximum difference being 7°.

FIG. 4 illustrates an eleven bladed reel constituting another preferred embodiment of this invention. If the blades were equally spaced in conventional fashion, there would be an angular displacement between adjacent blades corresponding to 1/11 of 360°, or approximately 32.77°. However, it will be noted that in the illustrated reel of FIG. 4, the blades are unequally spaced, with the spacing between each pair of adjacent blades different from the spacing between any other pair of adjacent blades. In FIG. 4, the blades have been successively labeled B1-B11 inclusive for purposes of identification. B1 and B2 are offset from each other by an angle of 34° 44', B2 and B3 by 36° 44', B3 and B4 by 37° 43', B4 and B5 by 35° 43', B5 and B6 by 33° 43', B6 and B7 by 31° 43', B7 and B8 by 29° 44', B8 and B9 by 27° 44', B9 and B10 by 28° 44'and B10 and B11 by 30° 44', and B11 and B1 by 32° 44'. Again the unequal spacing has been randomly applied throughout so that the differences are not uniformly progressive in either direction.

In the eleven bladed reel of FIG. 4, the successive difference between adjacent pairs of blades, beginning with B1-B2 and B2-B3 is 2°, 59', 2°, 2°, 2°, 1°, 59', 2°, 1°, 2°, 2° and 2° with the minimum difference between any two pairs in the assembly being 59 ' and the maximum 2°.

In one preferred embodiment of the eleven bladed reel illustrated in FIG. 4, the clip between B1 and B11 is 0.61 inches, 0.57 inches between B11 and B10, 0.53 inches between B10 and B9, 0.51 inches between B9 and B8, 0.55 inches between B8 and B7, 0.59 inches between B7 and B6, 0.63 inches between B6 and B5, 0.66 inches between B5 and B4, 0.70 inches between B4 and B3, 0.68 inches between B3 and B2, and 0,65 inches between B2 and B1. The maximum clip differential in this arrangement between adjacent clips is 0.04 inches and the minimum clip differential between adjacent clips is 0.02 inches with a differential of 0.19 inches between the widest and the narrowest clip, with a total clip of 6.702 inches for one complete revolution of the reel.

The reel illustrated in FIG. 5 is a five bladed reel constituting another preferred embodiment of this invention in which the blades are successively identified by the letters C1 through C5 inclusive. If the illustrated reel were of the conventional type, the blades would be equally spaced by an angular displacement corresponding to 1.5 of 360°, or 72°. However, in the reel of FIG. 5, the blades are unequally spaced, with the spacing between each pair of adjacent blades different from the spacing between any other pair. In the reel of FIG. 5, C1 and C2 are offset from each other by angle of 66°, C2 and C3 by 72°, C3 and C4 by 78°, C4 and C5 by 75°, and C5 and C1 by 69°. Again, the unequal spacing has been randomly applied throughout so that the differences are not uniformly progressive in either direction.

In FIG. 5, the successive differences in angular displacement between adjacent pairs of adjacent blades, beginning with the adjacent pair C1-C2 and C2-C3 is 6 degrees, 6°, 3°, 6°, and 3°, with the minimum difference between any given pair of blades and other pair in the assembly being 3°, and the maximum difference being 6°.

In one preferred embodiment of the five bladed reel of FIG. 5, the clip between C1 and C5 is 1.285 inches, 1.396 inches between C5 and C4, 1.451 inches between C4 and C3, 1.340 inches between C3 and C2, 1,230 inches between C2 and C1. The maximum clip differential in this arrangement between adjacent clips is 0.111 inches, and the minimum clip differential between adjacent clips is 0.055 inches, with a differential of 0.221 inches between the widest and the narrowest clip, with a total clip of 6.702 inches for one complete revolution of the reel.

The reel illustrated in FIG. 6 is a nine bladed reel constituting still another preferred embodiment of this invention. The blades have been successively labeled D1-D9 inclusive for purposes of identification. If the illustrated reel were of the conventional type, the blades would be equally spaced by an angular displacement corresponding to 1/9 of 360°, or 40°. However, in the reel of FIG. 6, the blades are unequally spaced and angularly offset from each other as follows: D1 and D2 by 43°, D2 and D3 by 39°, D3 and D4 by 35°, D4 and D5 by 40°, D5 and D6 by 36°, D6 and D7 by 41°, D7 and D8 by 37°, D8 and D9 by 42° and D9 and D1 by 47°. Again the unequal spacing has been randomly applied throughout so that the differences are not uniformily progressive in either direction.

In FIG. 6, the successive differences in angular displacement between adjacent pairs of adjacent blades, beginning with the adjacent pair D1-D2 and D2-D3 is 4°, 4°, 5°, 4°, 5°, 4°, 5°, 5° and 4°, with the minimum difference between any given pair of blades and any other pair in the assembly being 4°, and the maximum difference being 5°.

In one preferred embodiment of the nine bladed reel of FIG. 6, the clip between D1 and D9 is 0.875 inches, 0.782 inches between D9 and D8, 0.690 inches between D8 and D7 0.764 inches between D7 and D6, 0.670 inches between D6 and D5 0.745 inches between D5 and D4, 0.652 inches between D4 and D3, 0.726 inches between D3 and D2, and 0.800 inches between D2 and D1. The maximum clip differential in this arrangement between adjacent clips is 0.094 inches, and - the minimum clip differential between adjacent clips is 0.074 inches, with a differential of 0.223 inches between the widest and the narrowest clip, with a total clip of 6.702 inches for one complete revolution of the reel.

The term clip as used herein has the same meaning as normally applied in the reel mower art, that is, the linear distance in the direction of travel between the points of cutting engagement of the successive reel blades with the stationary bed knife.

Thus, by way of illustration, the linear increments (or clips) X1 to X5 inclusive have been shown in FIG. 5. X1 represents the linear distance traveled by the mower between the times blades C1 and C5 engage the bed knife, X2 represents the clip between blades C5 and C4, X3 represents the clip between C4 and C3, X4 represents the clip between C3 and C2, and X5 represents the clip between C2 and C1, with the total distance represented by X1 to X5 inclusive representing the total linear distance traveled by the mower during one complete revolution of the reel.

In the preferred embodiments of this invention, the angular displacement between each pair of adjacent blades in any reel assembly preferably does not substantially deviate (plus or minus) by more than 9° from the angular displacement between adjacent blades for an equally spaced assembly having the same number of blades. Thus, in a five blade equally spaced reel, the blades would have an angular displacement of 72°. In a five blade unequally spaced reel of this invention, each pair of adjacent blades preferably has an angular displacement therebetween substantially within the range of 63° to 81°.

Although the invention has been particularly described as it applies to reel mowers, it is to be understood that the scope of the invention is not necessarily limited thereto, and includes within its scope any bladed reel which works in cooperation with a stationary bar.

It will, of course, be understood that various changes and modifications of the preferred illustrated embodiments may be made within the spirit and scope of, and without departing from, this invention, and it is therefore intended to cover all such modifications in the appended claims.

We claim:

1. A reel mower comprising a bed knife and a rotatable cutting reel having at least three spiral cutting blades secured about a common axis and positioned to define a cutting edge for each said blade along the circumference of said reel to engage said bed knife for cutting grass therebetween, said spiral blades comprising a first blade located between a second blade and a third blade, said second blade located substantially parallel to said first blade along their coaxial length and located to define a first circumferential distance between said first and second blade, and said third blade located substantially parallel to said first blade along their coaxial length and located to define a second circumferential distance between said first and third blade, which second distance is different from said first distance to result in different time periods between said three blades engaging said bed knife and thus change the excitation frequency of said bed knife as caused by said three blades.

2. A reel mower of claim 1 wherein said reel includes more than three spiral parallel cutting blades and said blades are located wherein the circumferential distances between adjacent said blades are dissimilar from one another.

3. A reel mower of claim 2 wherein said circumferential distances between adjacent said blades does not progressively increase between successive adjacent blades in either circumferential direction about said reel.

4. A reel mower of claim 3, wherein said reel comprises an odd number of blades.

5. A reel mower of claim 4, wherein the difference in angular displacement between one pair of adjacent blades and any other pair of adjacent blades the reel is substantially in the range of 1 to 9°.

6. A reel mower of claim 4, wherein said circumferential distances vary from one another in the range of 0.018 to 0.170 inches.

7. A reel mower of claim 2, wherein said circumferential distances vary from one another in the range of 0.19 to 0.30 inches.

* * * * *